United States Patent [19]

DeJarlais et al.

[11] Patent Number: 5,339,686
[45] Date of Patent: Aug. 23, 1994

[54] WATER METER HOUSING CONNECTION APPARATUS

[75] Inventors: George DeJarlais, Wauwatosa; Mark D. Slaugenhoup, Kewaskum, both of Wis.

[73] Assignee: Badger Meter, Inc., Milwaukee, Wis.

[21] Appl. No.: 13,520

[22] Filed: Feb. 3, 1993

[51] Int. Cl.$^5$ .............................................. G01F 15/14
[52] U.S. Cl. ......................................... 73/201; 73/273
[58] Field of Search ................. 73/201, 273, 274, 431; 220/298, 300

[56] References Cited

U.S. PATENT DOCUMENTS 2,041,762  5/1936  Hazard et al. ..................... 220/298
3,308,664  3/1967  Kullmann ............................ 73/273
4,663,970  5/1987  Sutherland .......................... 73/273
4,811,600  3/1989  Rabitaille ............................ 73/201

OTHER PUBLICATIONS

BMI M25 Photos Version 1.
BMI M25 Photos Version 2.
Hersey 430-11 5/8 Photos.

Primary Examiner—Herbert Goldstein
Attorney, Agent, or Firm—Quarles & Brady

[57] ABSTRACT

A water meter housing has a scalloped edge positioned in a crevice where the housing attaches to a meter register housing to improve the tamper-resistant features of the assembly.

9 Claims, 2 Drawing Sheets

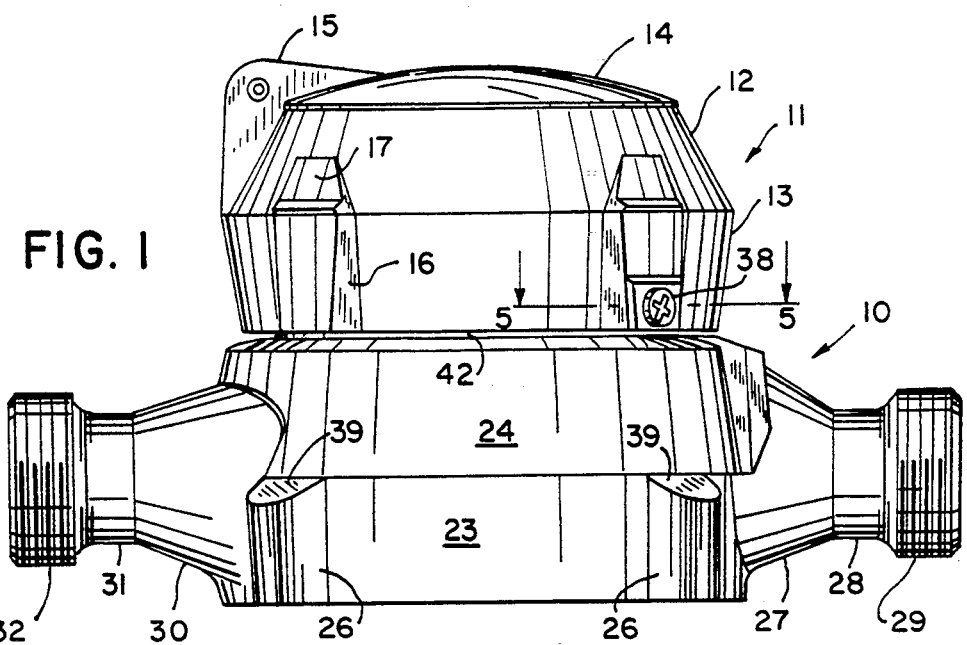
FIG. 1
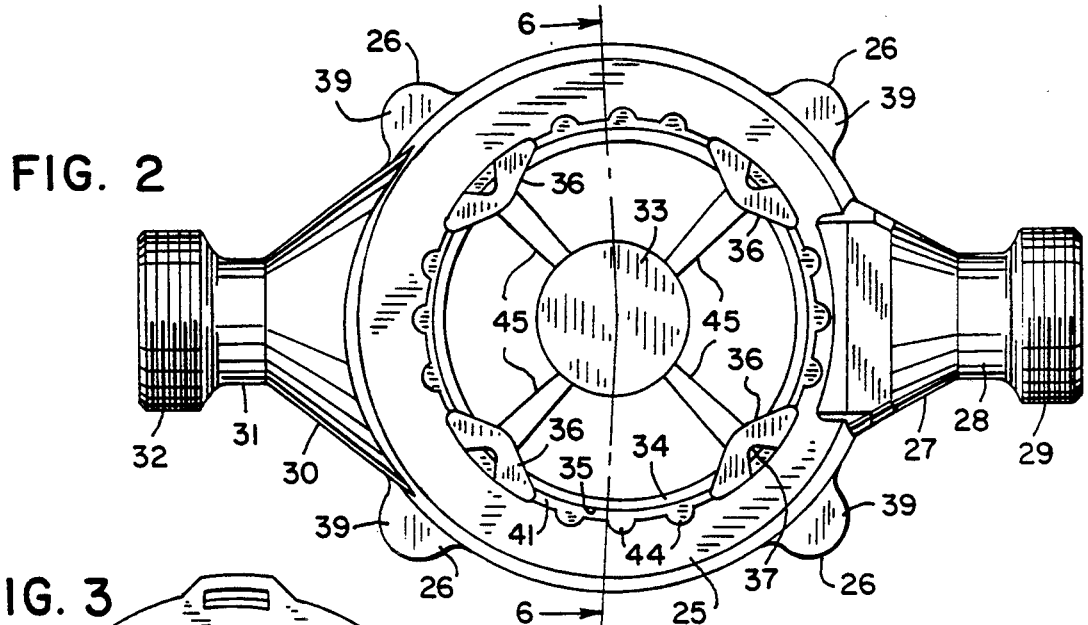
FIG. 2
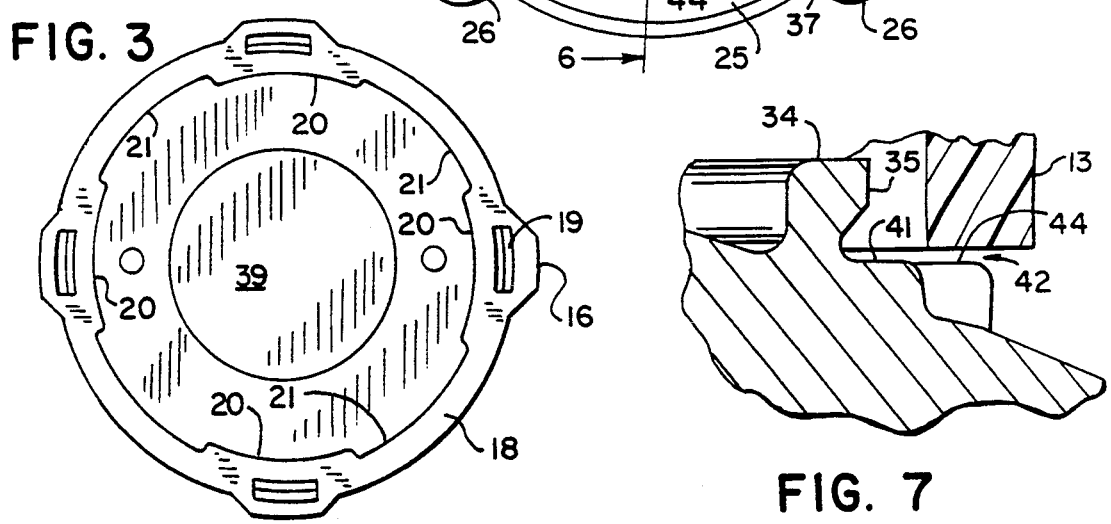
FIG. 3
FIG. 7

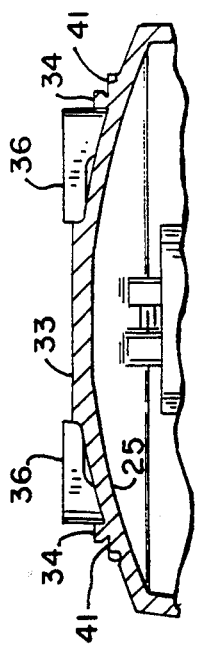
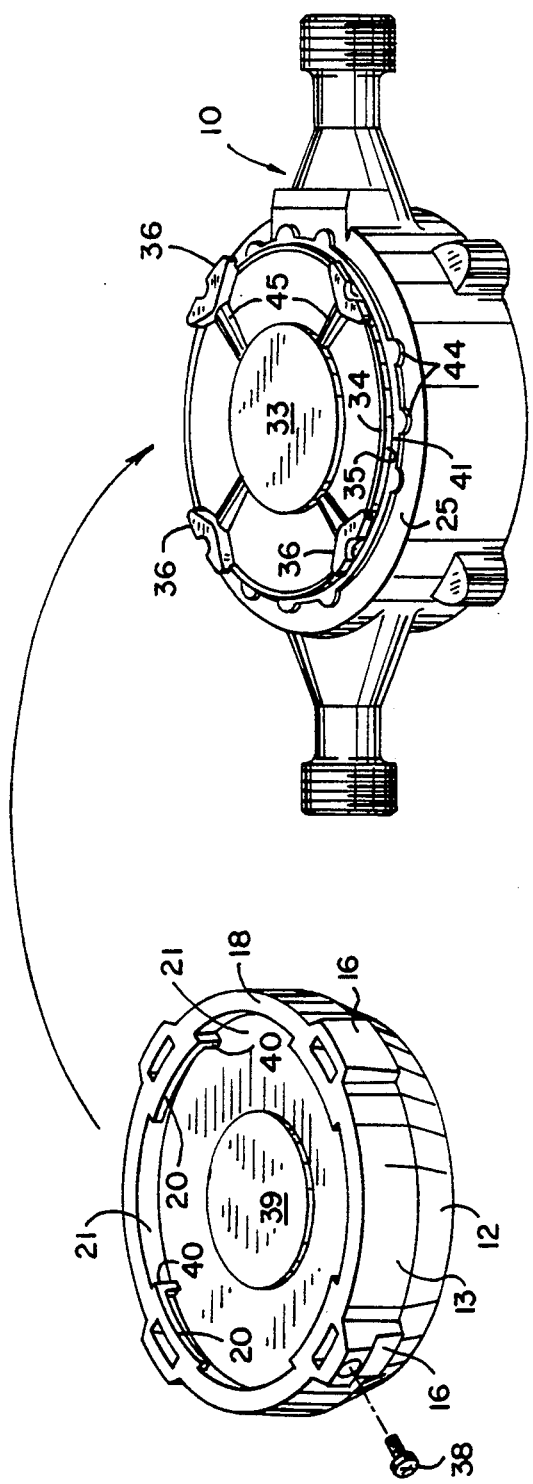
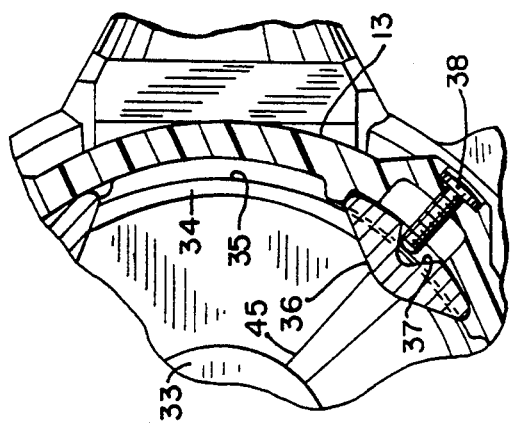

5,339,686

WATER METER HOUSING CONNECTION APPARATUS

BACKGROUND OF THE INVENTION

1. Field of the Invention

The invention relates to fluid meters and particularly to housings which may form a fitting in fluid supply line.

2. Description of the Background Art

A water meter housing of the prior art is made of a brass casting. It has an threaded inlet port coupling and a threaded outlet port coupling for connecting the housing in a water supply line. A meter register is mounted on top of the housing and includes a numerical display to indicate the volumetric usage by a utility customer.

A register housing is mounted in piggy-back fashion on top of the water meter housing. The coupling between the water meter housing and the register housing is arranged for easy twist-on, twist-off connection, resembling the so-called bayonet connection for attaching a lens to a camera. With the water meter housing being a casting, however, the features for connection are integrally formed on its top surface and project upward into openings in the bottom of the register housing which mounts on top of it.

As a result of the assembling of the register housing and water meter casting, a crevice is presented between the two housings. It is desirable for certain anti-tamper measures be taken with respect to this crevice.

The present invention is directed to improved constructions of the apparatus for connecting the water meter housing to the register housing.

SUMMARY OF THE INVENTION

The invention relates a water meter housing with a substantially flat annular ledge extending outwardly from a wall to provide a bearing surface for a bottom edge surface of a register housing. A plurality of spaced apart projections extend laterally from the ledge and radially outward with respect to a radial center of the top of the water meter housing, the projections extending in spaces between connection lugs to effectively extend the ledge radially at selected points.

In a preferred embodiment, this arrangement is seen as a scalloped edge around the outer rim of the annular bearing surface.

The invention aids in providing tamper-resistance in the area of a crevice between the bearing surface and the skirt of the register housing.

Additional features of the housing are an arcuate wall of uniform thickness between a central bearing surface and the annular bearing surface and the use of reinforcing ribs. This combination reduces material in this area.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 1 is a side view in elevation of a water meter housing of the present invention assembled to a meter register housing;

FIG. 2 is a top plan view of the water meter housing of FIG. 1; and

FIG. 3 is a bottom plan view of the meter register housing of FIG. 1;

FIG. 4 is an exploded perspective view of the apparatus of FIG. 1;

FIG. 5 is a detail sectional view taken in the plane indicated by line 5—5 in FIG. 1;

FIG. 6 is a transverse sectional view taken in the plane indicated by line 6—6 in FIG. 2; and FIG. 7 is an enlarged detail view of a portion of FIG. 6.

DETAILED DESCRIPTION OF THE PREFERRED EMBODIMENT

FIG. 1 shows a preferred embodiment of a water meter housing 10 of the present invention assembled to a meter register housing 11.

The register housing 11 includes an upper collar portion 12 of the sidewall assembled to a depending skirt portion 13 of the sidewall. A lid 14 is connected by a hinge 15 to the upper portion 12. The skirt portion 13 includes integrally formed bosses 16 with interior slots 19 (FIG. 3) for receiving barbed, stab connectors extending downward for complementing bosses 17 on the upper portion 12.

As seen in FIG. 3, the skirt portion 13 has a bottom surface 18 with openings into interior slots 19 of bosses 16. The bottom surface 18 has four spaced arcuate sectors 20 alternating with four arcuate niches 21 around the inside of circular bottom surface 18. As seen in FIG. 4, sectors 20 lead to stops 40 each of which projects at a right angle from a respective one of the sectors 20.

Referring to FIGS. 1 and 2, the water meter housing 10 is integrally formed as a brass casting, although it could also be made of plastic which is molded in the proper shape. The housing 10 has a circular sidewall that includes a lower portion 23 and an upper portion 24 tapering inwardly from the lower portion towards a top wall 25. Four footings 26 are spaced at 90-degree intervals around the outside of the lower portion 23. These footings 26 project from the lower portion 23 of the sidewall and have a beveled upper end 39 terminating at the boundary between the two portions 23, 24 of the sidewall. Within the footings 26 are tapped holes (not shown) for mating the housing 10 with a bottom closure.

An outlet spout forms a port in the sidewall 23, 24 and has a neck 27 tapering to a cylindrical portion 28 and to a threaded coupling 29. Around the sidewall 23, 24 by 180° is an inlet spout which forms a port in the sidewall 23, 24 and has a neck 30 tapering to a cylindrical portion 31 and to a threaded coupling 32.

The top wall 25 of the housing 10 has a centrally located, substantially flat embossment 33. At some radial distance from embossment 33 is a circular ridge 34 which forms a short vertical exposed wall 35. The ridge 34 fits just interior of the arcuate spaces 21 of the register housing 11 when assembled to the water meter housing 10. Four lugs 36 corresponding to the position of footings 26 are spaced 90° apart around the annular ring and project upwardly therefrom. The lugs 36 each form a V-shaped slot 37, one such slot receiving a screw 38 as seen in FIG. 5 to lock the register housing 11 in place after assembly.

To assemble the register housing 11 to the meter housing 10, the register housing is placed on top of the meter housing 10 to receive lugs 36 in niches 21. The register housing 11 is then rotated by hand until the lugs 36 meet stops 40 which are seen in FIG. 4. As housing 11 is rotated, a metal bottom 39 of the register seen in FIG. 3 bears on central bearing surface 33 and the bottom edge 18 of the register housing 11 bears on an annular surface formed by a circular ledge 41 extending at a right angle from ridge 34. Lugs 36 have a slight overhang to interlock with arcuate sectors 20. Screw 38 is then inserted to secure the register housing 11 in place.

With the housings assembled, there remains a crevice area 42 which is addressed by the present invention. The invention provides a plurality of spaced apart projections 44 extending laterally from the ledge 41 and radially outward with respect to a center of the annular ridge 34, the projections 44 extending in spaces between the lugs 36 to effectively extend the ledge 41 radially at selected points. This forms a scalloped edge which in conjunction with ridge 34 improves the tamper-resistant features of the assembly.

A further feature of the housing construction is that the top wall 25 is generally formed along a conic section and has an uniform wall thickness between the centrally located bearing surface 33 and the circular ridge 34. A plurality of reinforcing ribs 45 are formed on the top wall between the centrally located bearing surface 33 and the annular ridge 34 extending towards the respective lugs 36. This provides sufficient strength to the top wall 35 while conserving material.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A water meter housing with a plurality of lugs projecting from its top for insertion into, and connection with, a meter register housing having a plurality of arcuate spaces along an inner side of an annular bottom edge to receive said lugs, the water meter housing comprising:
   a portion around the top of the water meter housing which fits just interior of the arcuate spaces of the register hosing when assembled to the water meter housing, the portion forming a wall upstanding from a top wall of the water meter housing;
   wherein the plurality of lugs are spaced around the wall and project upwardly therefrom; and
   further comprising a substantially flat annular ledge extending outwardly from the wall to provide a bearing surface for a bottom edge surface of the register housing during assembly of the water meter housing and the register housing;
   further comprising a plurality of spaced apart projections extending laterally from the ledge and radially outward with respect to a radial center of the top of the water meter housing, the projections extending in spaces between the lugs to effectively extend the ledge radially at selected points; and
   wherein the projections form an outer scalloped edge around the bearing surface.

2. The water meter housing of claim 1, wherein the portion around the top of the water meter housing is an annular ridge.

3. The water meter housing of claim 2, further comprising
   a substantially flat platform centrally located on the top wall to form a bearing surface; and
   wherein the top wall is generally formed along a conic section and has a uniform wall thickness between the centrally located bearing surface and the annular ridge.

4. The water meter housing of claim 3, further comprising a plurality of reinforcing ribs formed on the top wall between the centrally located bearing surface and the annular ridge.

5. A water meter housing with a plurality of lugs projecting from its top for insertion into, and connection with, a meter register housing having a plurality of arcuate spaces along an inner side of an annular bottom edge to receive said lugs, the water meter housing comprising:
   an annular ridge around the top of the water meter housing which fits just interior of the arcuate spaces of the register housing when assembled to the water meter housing, the portion forming a wall upstanding from a top wall of the water meter housing;
   wherein the plurality of lugs are spaced around the wall and project upwardly therefrom; and
   further comprising a substantially flat annular ledge extending outwardly from the wall and beneath a bottom edge surface of the register housing to provide a bearing surface for the bottom edge surface of the register housing during assembly of the water meter housing and the register housing;
   wherein the flat annular ledge is spaced below the bottom edge surface of the register housing after assembly resulting in a clearance situated in a passage between an interior and an exterior of the register housing; and
   further comprising a plurality of spaced apart projections extending laterally from the ledge and radially outward with respect to a radial center of the top of the water meter housing, the projections extending in spaces between the lugs to effectively extend the ledge radially at selected points and substantially parallel to the bottom edge surface of the register housing to restrict the passage into an interior of the register housing beyond the annular ridge.

6. The water meter housing of claim 5, wherein
the projections form an outer scalloped edge around the bearing surface.

7. The water meter housing of claim 5, wherein the portion around the top of the water meter housing is an annular ridge.

8. A water meter housing with a plurality of lugs projecting from its top for insertion into, and connection with, a meter register housing having a plurality of arcuate spaces along an inner side of an annular bottom edge to receive said lugs, the water meter housing comprising:
   an annular ridge around the top of the water meter housing which fits just interior of the arcuate spaces of the register hosing when assembled to the water meter housing, the ridge forming a wall upstanding from a top wall of the water meter housing;

wherein the plurality of lugs are spaced around the wall and project upwardly therefrom; and further comprising a substantially flat annular ledge extending outwardly from the wall and beneath a bottom edge surface of the housing to provide a bearing surface for the bottom edge surface of the register housing during assembly of the water meter housing and the register housing;

wherein the flat annular ledge is spaced below the bottom edge surface of the register housing after assembly resulting in a clearance that opens to an exterior of the water meter housing and the register housing; and further comprising a plurality of spaced apart projections extending laterally from the ledge and radially outward with respect to a radial center of the top of the water meter housing, the projections extending in spaces between the lugs to effectively extend the ledge radially at selected points with respect to the bottom edge surface of the register housing;

and further comprising a substantially flat platform centrally located on the top wall to form a bearing surface; and wherein the top wall is generally formed along a conic section and has a uniform wall thickness between the centrally located bearing surface and the annular ridge.

9. The water meter housing of claim 8, further comprising a plurality of reinforcing ribs formed on the top wall between the centrally located bearing surface and the annular ridge.

* * * * *

UNITED STATES PATENT AND TRADEMARK OFFICE
CERTIFICATE OF CORRECTION

PATENT NO. : 5,339,686
DATED : August 23, 1994
INVENTOR(S) : George DeJarlais, Mark Slaugenhoup It is certified that error appears in the above—identified patent and that said Letters Patent is hereby corrected as shown below:

Col. 1, line 13    "an" should be --a--.

Col. 1, line 32    Add --to-- after "measures".

Col. 1, line 38    Add --to-- after "relates".

Col. 2, line 7     Omit "and".

Col. 3, line 27    "an" should be --a--.

Col. 3, line 53    "hosing" should be --housing--.

Col. 4, line 67    "hosing" should be --housing--.

Signed and Sealed this

Twenty-ninth Day of November, 1994

Attest:

BRUCE LEHMAN

Attesting Officer    Commissioner of Patents and Trademarks